US009848369B2

(12) United States Patent
Maheshwari et al.

(10) Patent No.: US 9,848,369 B2
(45) Date of Patent: Dec. 19, 2017

(54) MANAGING TUNE-AWAYS IN A MULTI-SUBSCRIPTION MULTI-STANDBY COMMUNICATION DEVICE

(71) Applicant: QUALCOMM Incorporated, San Diego, CA (US)

(72) Inventors: Shailesh Maheshwari, San Diego, CA (US); Kuo-Chun Lee, San Diego, CA (US); Sivaramakrishna Veerepalli, San Diego, CA (US); Mohan Krishna Gowda, San Diego, CA (US); Pavan Chaithanya Kaivaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 14/927,330

(22) Filed: Oct. 29, 2015

(65) Prior Publication Data

US 2017/0127329 A1   May 4, 2017

(51) Int. Cl.
| | |
|---|---|
| *H04W 36/30* | (2009.01) |
| *H04W 28/04* | (2009.01) |
| *H04W 60/00* | (2009.01) |
| *H04W 36/14* | (2009.01) |
| *H04W 88/06* | (2009.01) |

(52) U.S. Cl.
CPC ......... *H04W 36/30* (2013.01); *H04W 28/042* (2013.01); *H04W 36/14* (2013.01); *H04W 60/005* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 9,042,250 B2* | 5/2015 | Hou | H04W 4/003 370/252 |
| 9,131,429 B1 | 9/2015 | Bharadwaj et al. | |
| 2011/0117909 A1* | 5/2011 | Cao | H04W 48/18 455/423 |
| 2013/0172023 A1 | 7/2013 | Chan et al. | |
| (Continued) | | | |

OTHER PUBLICATIONS

International Search Report and Written Opinion—PCT/US2016/057998—ISA/EPO—Apr. 6, 2017.

*Primary Examiner* — Steve Young
(74) *Attorney, Agent, or Firm* — The Marbury Law Group

(57) ABSTRACT

Various embodiments include a device processor that may monitor a data loss from a broadcast data stream received by a radio frequency (RF) resource of a multi-subscription multi-standby (MSMS) communication device using a first subscription. In response to determining that an amount of the monitored data loss plus an amount of expected data loss from anticipated tune-aways to a second subscription and a third subscription does not meet a first data loss threshold, the device processor may determine whether an amount of the monitored data loss plus an amount of expected data loss from an anticipated tune-away to a third subscription meets a second data loss threshold. The device processor may prevent the tune-away to the third subscription in response to determining that the amount of the monitored data loss plus the expected data loss from the anticipated tune-away to the third subscription meets the second data loss threshold.

30 Claims, 9 Drawing Sheets

(56) References Cited

U.S. PATENT DOCUMENTS

| | | | |
|---|---|---|---|
| 2013/0215846 A1 | 8/2013 | Yerrabommanahalli et al. | |
| 2013/0244660 A1* | 9/2013 | Kumar | H04W 36/165 455/436 |
| 2013/0295920 A1* | 11/2013 | Viswanadham | H04W 36/14 455/426.1 |
| 2013/0303181 A1* | 11/2013 | Rajurkar | H04W 72/0453 455/452.1 |
| 2014/0220981 A1* | 8/2014 | Jheng | H04W 76/045 455/437 |
| 2014/0274051 A1 | 9/2014 | Hsu et al. | |
| 2015/0237497 A1* | 8/2015 | Chen | H04W 8/183 455/558 |
| 2015/0237597 A1 | 8/2015 | Kanamarlapudi et al. | |

* cited by examiner

MANAGING TUNE-AWAYS IN A MULTI-SUBSCRIPTION MULTI-STANDBY COMMUNICATION DEVICE

BACKGROUND

A multi-subscription multi-standby communication device may include one or more Subscriber Identity Module (SIM) cards that provide users with access to multiple separate mobile telephony networks. Each SIM may be associated with a different service provider subscription, enabling the multi-subscription multi-standby communication device to communicate with one or more communication networks. Each SIM or subscription may also be associated with a radio access technology (RAT).

A multi-subscription communication device that includes one or more SIMs and connects to two or more separate mobile telephony networks using one or more shared radio frequency (RF) resources/radios may be termed a "multi-standby" communication device. One example of a multi-subscription multi-standby communication device is a dual-SIM-dual-standby (DSDS) communication device, which includes two SIM cards that share a set of radio frequency (RF) circuitry (referred to as an "RF chain" or a "RF resource chain") to communicate with two separate mobile telephony networks on behalf of their respective subscriptions. Another example is a single-radio LTE (SRLTE) communication device, which includes one SIM card/subscription associated with two (or more) subscriptions that share a single shared RF resource chain to communicate with one or more multi-subscription multi-standby communication networks on behalf of the multiple subscriptions.

At certain times the multiple subscriptions sharing an RF resource chain may need to use the RF resource to communicate with their respective mobile networks simultaneously. Therefore, the communication device may periodically force one subscription to interrupt its RF operations so that another subscription may use the shared RF resource chain to perform communication operations, a process called a "tune-away," since the RF resource chain must tune away from the frequency bands and/or channels of the first subscription and must tune to frequency bands/channels of the second subscription. As a result of the tune-away, data received using the active subscription may be lost or corrupted and thus difficult or impossible to decode. The problem of data loss during a tune-away is exacerbated when the first subscription is conducting communications that are particularly sensitive to latency or data loss, such as streaming media, for example, eMBMS (Evolved Multimedia Broadcast Multicast Service).

SUMMARY

The various embodiments include methods and multi-subscription multi-standby communication devices implementing methods for managing a tune-away by an RF resource of the multi-subscription multi-standby communication device. The various methods may include monitoring an amount of data loss from a broadcast data stream received by the MSMS communication device using a first subscription, determining an amount of expected data loss from anticipated tune-aways from the first subscription to a second subscription, determining an amount of expected data loss from anticipated tune-aways from the first subscription to a third subscription, determining whether the amount of the monitored data loss plus the amount of expected data loss from anticipated tune-aways from the first subscription to the second subscription plus the amount of expected data loss from anticipated tune-aways from the first subscription to the third subscription meets a first data loss threshold, determining whether an amount of the monitored data loss plus an amount of expected data loss from a next anticipated tune-away from the first subscription to the third subscription meets a second data loss threshold in response to determining that the amount of the monitored data loss plus the amount of expected data loss from anticipated tune-aways from the first subscription to the second subscription plus the amount of expected data loss from anticipated tune-aways from the first subscription to the third subscription does not meet the first data loss threshold, and preventing a tune-away of the RF resource from the first subscription to the third subscription in response to determining that the amount of the monitored data loss plus the amount of expected data loss from the next anticipated tune-away from the first subscription to the third subscription meets the second data loss threshold.

Some embodiments may further include permitting the tune-away of the RF resource from the first subscription to the third subscription in response to determining that the amount of the monitored data loss plus the amount of expected data loss from the next anticipated tune-away from the first subscription to the third subscription does not meet the second data loss threshold. Some embodiments may further include permitting a tune-away of the RF resource from the first subscription to the second subscription after determining whether the amount of the monitored data loss plus the amount of expected data loss from the next anticipated tune-away from the first subscription to the third subscription meets the second data loss threshold. Some embodiments may further include preventing tune-aways from the first subscription to the second subscription and to the third subscription in response to determining that the amount of the monitored data loss plus the amount of expected data loss from anticipated tune-aways from the first subscription to the second subscription plus the amount of expected data loss from anticipated tune-aways from the first subscription to the third subscription meets the first data loss threshold.

In some embodiments, preventing a tune-away of the RF resource from the first subscription to the third subscription in response to determining that the amount of the monitored data loss plus the amount of expected data loss from the next anticipated tune-away from the first subscription to the third subscription meets the second data loss threshold may include determining an amount of reduction for a second data loss threshold based on an amount of data loss that is attributable to past tune-aways from the first subscription to the second subscription, reducing the second data loss threshold by the determined amount of reduction, determining whether the amount of the monitored data loss plus the amount of expected data loss from the next anticipated tune-away from the first subscription to the third subscription meets the reduced second data loss threshold, and preventing a tune-away of the RF resource from the first subscription to the third subscription in response to determining that the amount of the monitored data loss and the expected data loss from the anticipated tune-away from the first subscription to the third subscription meets the reduced second data loss threshold.

Some embodiments may further include permitting the tune-away of the RF resource from the first subscription to the third subscription in response to determining that the amount of the monitored data loss plus the amount of expected data loss from the anticipated tune-away from the first subscription to the third subscription does not meet the reduced second data loss threshold. Some embodiments may further include determining whether a collision between reception of the broadcast data stream and a tune-away from the first subscription to the second subscription is detected, and increasing the second data loss threshold in response to determining that the collision between reception of the broadcast data stream and the tune-away from the first subscription to the second subscription is detected. Such embodiments may include increasing the second data loss threshold by the determined amount of reduction in response to determining that the collision between reception of the broadcast data stream and the tune-away from the first subscription to the second subscription is detected.

Some embodiments may further include continuing to receive segment data of the broadcast data stream using the first subscription in response to determining that the collision between reception of the broadcast data stream and the tune-away from the first subscription to the second subscription is not detected. Some embodiments may further include determining whether another collision between reception of the broadcast data stream and a tune-away from the first subscription to the second subscription is expected, and increasing the second data loss threshold in response to determining that the another collision between reception of the broadcast data stream and the tune-away from the first subscription to the second subscription is not expected. Such embodiments may include increasing the second data loss threshold by the determined amount of reduction in response to determining that the another collision between reception of the broadcast data stream and the tune-away from the first subscription to the second subscription is not expected.

Some embodiments may further include continuing to receive segment data of the broadcast data stream using the first subscription in response to determining that the another collision between reception of the broadcast data stream and the tune-away from the first subscription to the second subscription is expected. Some embodiments may further include determining a biased block probability threshold, determining a random number for a present segment of the broadcast data stream, determining whether the determined random number meets the biased block probability threshold, and permitted the tune-aways of the RF resource from the first subscription to the third subscription in response to determining that the determined random number meets the biased block probability threshold. Such embodiments may further include determining whether an amount of the monitored data loss plus an amount of expected data loss from a next anticipated tune-away from the first subscription to the third subscription meets the second data loss threshold in response to determining that the determined random number does not meet the biased block probability threshold.

Various embodiments further include a multi-subscription multi-standby communication device having a memory, an RF resource, and a processor coupled to the memory and the RF resource and configured with processor executable instructions to perform operations of the methods described above. Various embodiments include a a multi-subscription multi-standby communication device having means for performing functions of the methods described above. Various embodiments include a non-transitory processor-readable storage medium having stored thereon processor-executable instructions configured to cause a processor of a multi-subscription multi-standby communication device to perform operations of the methods described above.

BRIEF DESCRIPTION OF THE DRAWINGS

The accompanying drawings, which are incorporated herein and constitute part of this specification, illustrate exemplary embodiments. Together with the general description given above and the detailed description given below, the drawings serve to explain features of various embodiments, and not to limit various embodiments.

DETAILED DESCRIPTION

Figure 1:
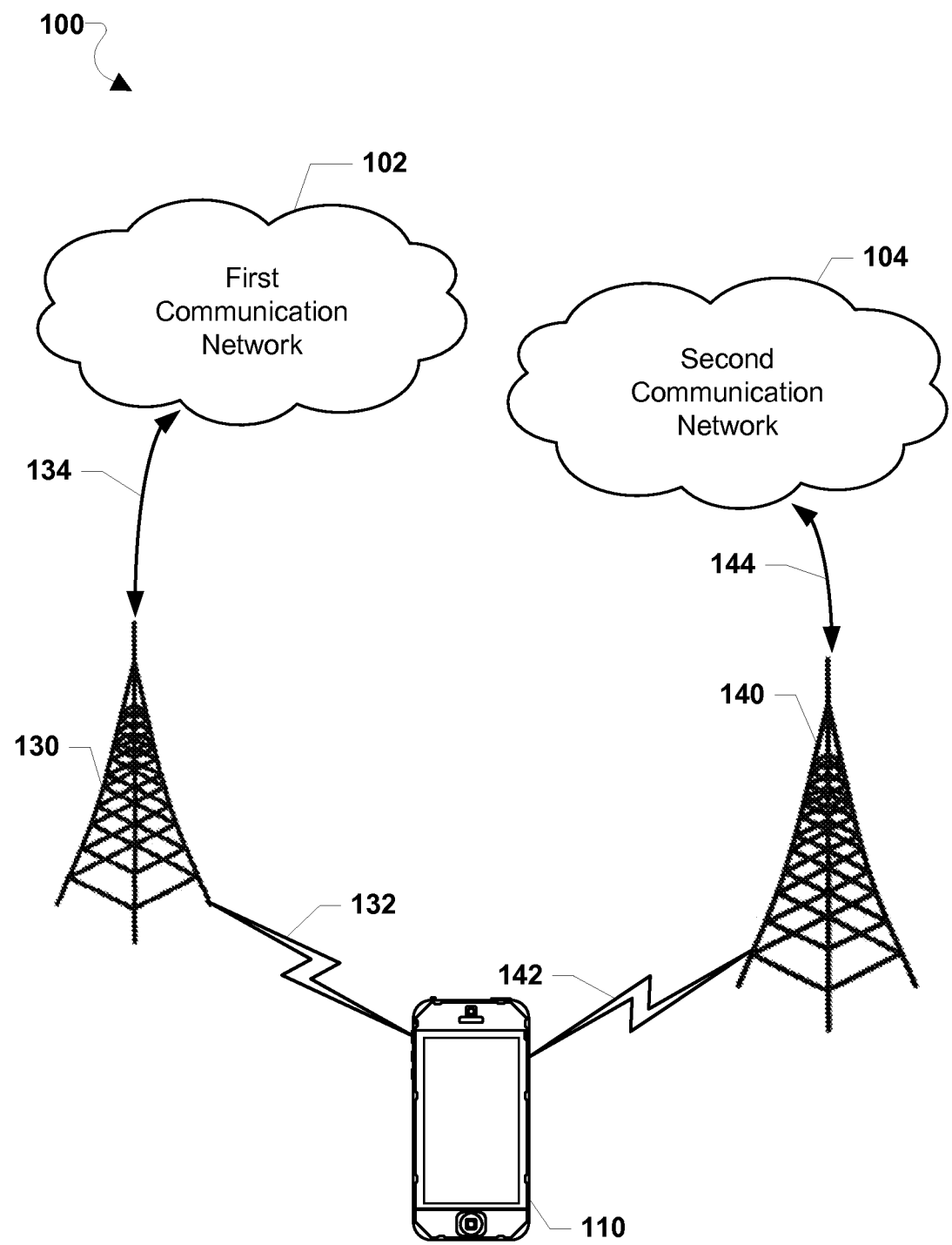
FIG. 1 is a component block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods implemented multi-subscription multi-standby communication devices that enable reception of cell broadcasts on a first network while reducing degradation of throughput of data of an active communication session on a second network by appropriately scheduling tune-aways to the first network.

The terms "multi-subscription multi-standby communication device" and "MSMS communication device" refer to any one or all of cellular telephones, smartphones, personal or mobile multi-media players, personal data assistants, laptop computers, tablet computers, smartbooks, palmtop computers, wireless electronic mail receivers, multimedia Internet enabled cellular telephones, wireless gaming controllers, and similar electronic devices and portable computing platforms which include a programmable processor, a memory, and one or more shared RF resources, and which are configured to support communications over two or more subscriptions. Various embodiments may be particularly useful in any communication devices that can support multiple wireless wide area network subscriptions and communication sessions with two or more communication networks.

The terms "component," "module," "system," and the like as used herein are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

References to "first network," "first subscription," "second network" and "second subscription" are arbitrary and are used to refer to two or more subscriptions/networks generally because at any given time either subscription/network may be in an active mode (on an active voice or data call) or a standby mode. For example, at a first time, a first subscription with a first network may be on an active data call (and thus a "first" subscription) while a second subscription with a second network is in the standby mode (and thus a "second" subscription), and at a second time, the second subscription may enter an active data call (becoming the "first" subscription) and the first subscription may enter the standby mode (becoming the "second" subscription). Also, references to "first" and "second" subscriptions and networks is not intended to imply that the embodiments are limited to two subscriptions sharing one radio frequency (RF) resource, because three or more subscriptions may share one RF resource provided that only one subscription can use the RF resource at a time. Third and fourth subscriptions would behave similar to a second subscription. Therefore, in the interest of brevity, operations of subscriptions in the standby mode that share the RF resource during tune-away periods are described generally with reference to the "second" subscription.

In multi-subscription multi-standby communication devices, only one subscription may use each RF resource chain to communicate with its communication network at a time. Even when a subscription is in an idle mode or a standby mode, meaning the subscription is not actively communicating with the network, the subscription may still need to periodically receive access to a shared RF resource chain in order to perform various network operations. For example, an idle subscription may need the shared RF resource chain at regular intervals to perform idle mode operations, to receive network-paging messages in order to remain connected to the network, etc. on behalf of its subscription. Therefore, it is possible that at a certain times the multiple subscriptions sharing an RF resource chain may need to use the RF resource chain to communicate with their respective mobile networks simultaneously.

The multi-subscription multi-standby communication device may force a subscription that is actively using a shared RF resource chain to interrupt its RF operations so that an idle subscription may use the shared RF resource chain to perform idle-standby mode operations. This process of switching access of the shared RF resource chain from the active subscription to the idle subscription is sometimes referred to as a "tune-away" as the RF resource chain must tune away from the frequency bands and/or channels of the active subscription and tune to frequency bands/channels of the idle subscription. After network communications via the idle subscription are complete, the communication device may switch RF resource chain access back from the idle subscription to the active subscription. Examples of idle-standby mode operations may include one or more of page monitoring (e.g., discontinuous reception), system information monitoring (e.g., receiving and decoding a broadcast control channel), cell reselection measurements to determine whether to initiate reselection operations to a neighboring cell, updating the second subscription network with the current location of the multi-standby communication device, receiving Short Message Service (SMS) messages, and receiving mobile-terminated calls (sometimes collectively referred to herein as tune-away operations).

As a result of the tune-away, data received from the active subscription may be lost or corrupted and thus may be difficult or impossible to decode. The tune-away may thus decrease the throughput of communications between the multi-subscription multi-standby communication device and the communication network of the active subscription, and may degrade the quality of an active communication session over the communication network. The problem of data loss during a tune-away may also impact the user experience when the first subscription is conducting communications that are particularly sensitive to latency or data loss, such as streaming media, for example, eMBMS (Evolved Multimedia Broadcast Multicast Service). Thus, operations performed by a processor of a multi-subscription multi-standby communication device may include determining whether to permit or prevent a scheduled tune-away. The impact of tune-aways on data reception using a first subscription may increase when, for example, the MSMS communication device includes two or more additional subscriptions that the MSMS communication device must monitor in addition to receiving data using the first subscription.

Various embodiments enable a processor of a multi-subscription multi-standby communication device to permit or to block a scheduled tune-away based on current and estimated data reception and data loss to improve to data reception of a data stream. Typically, tune-aways are periodically scheduled according to a timing dictated by a RAT. However, a processor of a multi-subscription multi-standby communication device may determine whether to permit or prevent a given tune-away.

Media files may be divided into segments for transport to the communication device. Each segment may be sent to the communication device in a number of bursts. Each burst may include a number of subframes. Data in a segment (segment data) may include media data (e.g., content data) and error correction data (such as forward error correction (FEC) data) that may enable the receiver device to recover a segment when some media data is lost or corrupted during transmission. Thus, in many cases the multi-subscription multi-standby communication device does not need to receive all of the data of the segment in order to recover the segment because error correction data in the received portions of the segment can be used to recover the segment from less than all of the media data. In some embodiments, the multi-subscription multi-standby communication device may calculate or determine a permitted data loss from a segment based on an amount of media data or content data and an amount of error correction data in the segment.

In various embodiments, the MSMS communication device may monitor a data loss from a broadcast data stream during reception of the data stream by the MSMS communication device. In some embodiments, the MSMS communication device may monitor the data loss from (e.g., during) a segment of the broadcast data stream (e.g., the MSMS communication device may monitor data loss from the data stream on a per-segment basis) The monitored data loss may be caused at least in part by performing one or more tune aways to one or more of the subscriptions (i.e., to a second subscription, a third subscription, etc.). In some embodiments, the MSMS communication device may determine a portion of the overall data loss that is attributable to each of the subscriptions to which the MSMS communication device tunes away its RF resource chain. In some embodiments, the MSMS communication device may block or prevent tune-aways to the third subscription based on an amount of the monitored data loss plus an expected amount of data loss from an anticipated tune-away to the third subscription meets (e.g., exceeds) a data loss threshold. In some embodiments, the MSMS communication device may block one or more tune-aways to the third subscription on a segment by segment basis (e.g., may block one or more tune-aways during reception of one segment, but not during reception of another segment).

In some embodiments, the MSMS communication device may use a data loss threshold for each subscription to determine whether to block tune-aways to each subscription. For example, the MSMS communication device may set a separate data loss threshold for the second subscription and the third subscription, and may block tune-aways to a subscription when tune-aways to that subscription cause data loss above that subscription's data loss threshold. The MSMS communication device may also adjust each subscriptions data loss threshold to change the likelihood of blocking tune-aways to each subscription. In various embodiments, the MSMS communication device may lower the data loss threshold for the third subscription based on data loss caused by tune-aways to the second subscription. In some embodiments, the MSMS communication device may adjust the third subscription data loss threshold based on an amount of data loss caused by the tune-aways to the second subscription.

In some embodiments, the second subscription may be assigned a higher priority than the third subscription, so that the MSMS communication device may block tune-aways to the third subscription, rather than to the second subscription. For example, a network operator may prioritize one subscription over another to bias the MSMS communication device to using a first subscription network more frequently than a second subscription network. As another example, a user of the MSMS communication device may similarly prefer to use a first subscription (e.g., a work-related subscription) over a second subscription (e.g., a personal subscription).

As another example, the MSMS communication device may determine that the second subscription includes a less frequent tune-away cycle (e.g., a paging cycle) than the third subscription. Because blocking tune-aways to the third subscription may block fewer opportunities to receive data on the third subscription than opportunities to receive data on the second subscription, the MSMS communication device may prioritize the second subscription over the third subscription. For example, Single-Carrier Radio Transmission Technology (1×RTT) has a substantially longer paging cycle than Global System for Mobility (GSM)—that is, there are longer intervals between tune-aways to 1×RTT). Blocking tune-aways to GSM may result in fewer missed paging messages than blocking tune-aways to 1×RTT.

As another example, the MSMS communication device may determine a relative priority of subscriptions based on a number of collisions between data stream/segment reception and tune-aways to each subscription. For example, the MSMS communication device may determine that the second subscription is experiencing fewer collisions between its tune-aways and data stream reception than the third subscription, and the MSMS communication device may block tune-aways to the third subscription to increase overall data stream reception.

In some embodiments, the MSMS communication device may stop blocking tune-aways to the third description in response to detecting a tune-away to the second subscription that overlaps/collides with data stream reception. Additionally or alternatively, in some embodiments, the MSMS communication device may stop blocking tune-aways to the third description for a particular segment of the data stream in response to determining that no further tune-aways to the second subscription are scheduled during the remainder of the segment.

In some embodiments, the MSMS communication device may probabilistically apply tune-away blocking in order to only block tune-aways to the third subscription during some segments and not during others. For example, the MSMS communication device may determine whether to block or not to block a tune-away to the third subscription in a random manner.

Various embodiments may be implemented in multi-subscription multi-standby communication devices that may operate within a variety of communication systems particularly systems that include two or more communication networks. FIG. 1 illustrates a communication system 100 suitable for use with various embodiments. A multi-subscription multi-standby communication device 110 may communicate with the first communication network 102 through a communication link 132 to the first base station 130. In some embodiments, the multi-subscription multi-standby communication device 110 may include a multi-subscription multi-standby (MSMS) communication device. The multi-subscription multi-standby communication device 110 may also communicate with the second mobile network 104 through a communication link 142 to the second base station 140. The first base station 130 may communicate with the first communication network 102 over a wired or wireless communication link 134, and the second base station 140 may communicate with the second communication network 104 over a wired or wireless communication link 144. The communication links 134 and 144 may include fiber optic backhaul links, microwave backhaul links, and other similar communication links.

Each of the communication networks 102 and 104 may support communications using one or more RATs, and each of the wireless communication links 132 and 142 may include cellular connections that may be made through two-way wireless communication links using one or more RATs. Examples of RATs may include 3GPP Long Term Evolution (LTE), GSM, Worldwide Interoperability for Microwave Access (WiMAX), Code Division Multiple Access (CDMA), WCDMA, Time Division Multiple Access (TDMA), 1×RTT, Evolution-Data Optimized (EV-DO), and other RATs. While the communication links 132 and 142 are illustrated as single links, each of the communication links may include a plurality of frequencies or frequency bands, each of which may include a plurality of logical channels. Additionally, each of the communication links 132 and 142 may utilize more than one RAT.

Figure 2:
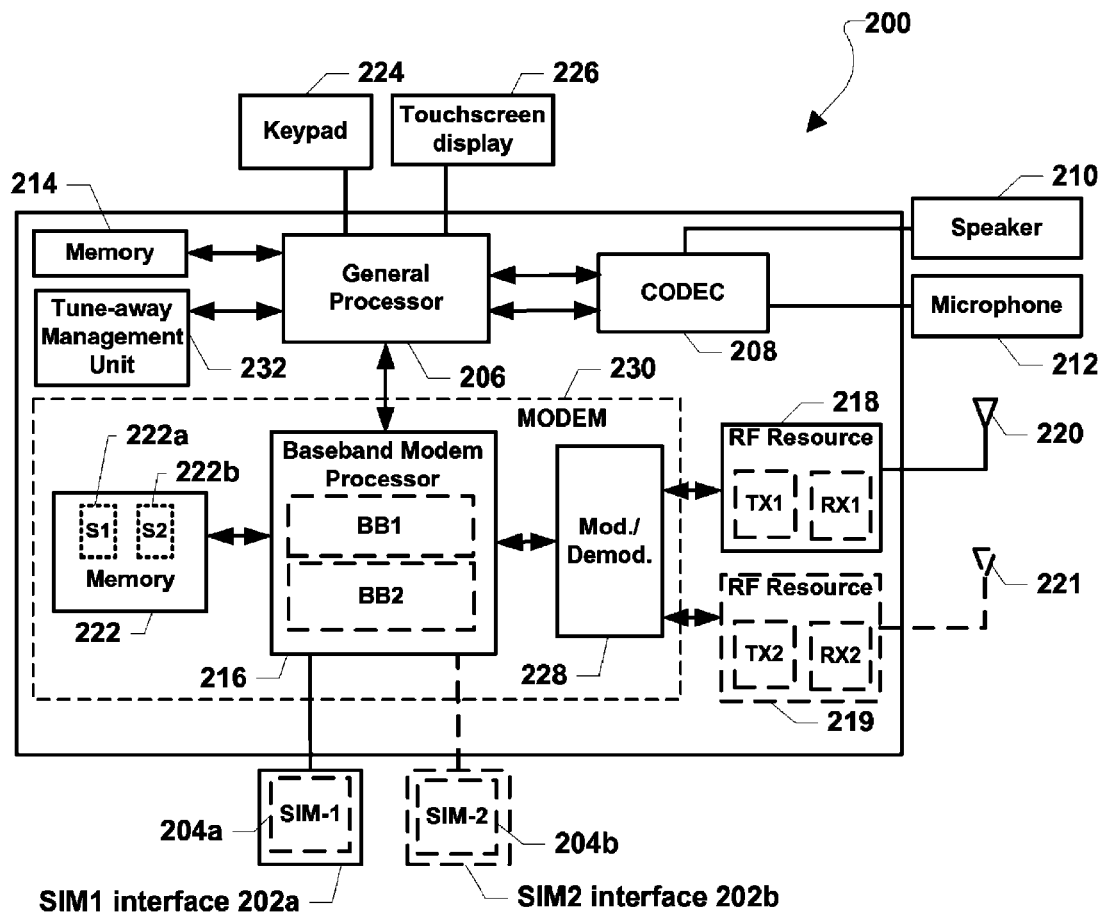
FIG. 2 is a component block diagram of a multi-subscription multi-standby communication device according to various embodiments.

FIG. 2 is a component block diagram of a multi-subscription multi-standby communication device 200 suitable for implementing various embodiments. With reference to FIGS. 1 and 2, in various embodiments, the multi-subscription multi-standby communication device 200 may be similar to the multi-subscription multi-standby communication device 110. The multi-subscription multi-standby communication device 200 may include a first SIM interface 202*a*, which may receive a first identity module SIM-1 204*a* that may be associated with a first subscription. The multi-subscription multi-standby communication device 200 may optionally also include a second SIM interface 202*b*, which may receive a second identity module SIM-2 204*b* that may be associated with a second subscription. The multi-subscription multi-standby communication device 200 may optionally include additional SIM interfaces (not illustrated) which may receive an additional identity module.

A SIM in various embodiments may be a Universal Integrated Circuit Card (UICC) that is configured with SIM and/or USIM (Universal Subscriber Identity Module) applications, enabling access to, for example, GSM and/or Universal Mobile Telecommunications System (UMTS) networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM and I/O circuits. A SIM used in various embodiments may contain user account information, an international mobile subscriber identity (IMSI), a set of SIM application toolkit (SAT) commands and storage space for phone book contacts. A SIM card may further store a Home-Public-Land-Mobile-Network (HPLMN) code to indicate the SIM card network operator provider. An Integrated Circuit Card Identity (ICCID) SIM serial number may be printed on the SIM card for identification.

The multi-subscription multi-standby communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The memory 214 may be a non-transitory computer-readable storage medium that stores processor-executable instructions. The memory 214 may store an operating system (OS), as well as user application software and executable instructions. The memory 214 may also store application data, such as an array data structure.

The general-purpose processor 206 may be coupled to a modem 230. The modem 230 may include at least one baseband modem processor 216, which may be coupled to a memory 222 and a modulator/demodulator 228. The baseband modem processor 216 may include physically or logically separate baseband modem processors (e.g., BB1, BB2). The modulator/demodulator 228 may receive data from the baseband modem processor 216 and may modulate a carrier signal with encoded data and provide the modulated signal to the RF resource 218 for transmission. The modulator/demodulator 228 may also extract an information-bearing signal from a modulated carrier wave received from the RF resource 218, and may provide the demodulated signal to the baseband modem processor 216. The modulator/demodulator 228 may be or include a digital signal processor (DSP).

In some optional embodiments, the multi-subscription multi-standby communication device 200 may include an optional RF resource 219 configured similarly to the RF resource 218 and coupled to an optional wireless antenna 221. In such embodiments, the multi-subscription multi-standby communication device 200 may leverage the multiple RF resources 218, 219 and antennae 220, 221 to perform diversity receiver reception during a tune-away.

The baseband modem processor 216 may read and write information to and from the memory 222. The memory 222 may also store instructions associated with a protocol stack, such as protocol stack S1 222*a* and protocol stack S2 222*b*. The protocol stacks S1 222*a*, S2 222*b* generally include computer executable instructions to enable communication using a radio access protocol or communication protocol. Each protocol stack S1 222*a*, S2 222*b* typically includes network protocol layers structured hierarchically to provide networking capabilities. The modem 230 may include one or more of the protocol stacks S1 222*a*, S2 222*b* to enable communication using one or more RATs. The protocol stacks S1 222*a*, S2 222*b* may be associated with a SIM card (e.g., SIM-1 204*a*, SIM-2 204*b*) configured with a subscription. For example, the protocol stack S1 222*a* and the protocol stack S2 222*b* may be associated with the SIM-1 204*a*. The illustration of only two protocol stacks S1 222*a*, S2 222*b* is not intended as a limitation, and the memory 222 may store more than two protocol stacks (not illustrated).

Each SIM and/or RAT in the multi-subscription multi-standby communication device 200 (e.g., SIM-1 204*a*, SIM-2 204*b*) may be coupled to the modem 230 and may be associated with or permitted to use an RF resource. The term "RF resource chain" may be used to refer to all of the circuitry used to send and/or receive RF signals, which may include the baseband modem processor 216 that performs baseband/modem functions for communicating with/controlling a RAT, one or more radio units including transmitter and receiver components that are shown as RF resource 218, and optional RF resource 219, one or more of the wireless antenna 220 and the optional wireless antenna 221, and additional circuitry that may include one or more amplifiers and radios. In some embodiments, an RF resource may share a common baseband modem processor 216 (i.e., a single device that performs baseband/modem functions for all RATs on the multi-subscription multi-standby communication device). In some embodiments, each RF resource may include the physically or logically separate baseband processors (e.g., BB1, BB2).

The RF resources 218, 219 may include transceivers associated with one or more RATs and may perform transmit/receive functions for the multi-subscription multi-standby communication device 200 on behalf of their respective RATs. The RF resources 218, 219 may include separate transmit and receive circuitry. In some embodiments, the RF resources 218, 219 may include only receive circuitry. The RF resources 218, 219 may each be coupled to a wireless antenna (e.g., the first wireless antenna 220 and the second wireless antenna 221). The RF resources 218, 219 may also be coupled to the modem 230 (e.g., via the modulator/demodulator 228, the baseband modem processor 216, or another component).

In some embodiments, the general-purpose processor 206, memory 214, baseband processor(s) 216, and the RF resources 218, 219 may be included in the multi-subscription multi-standby communication device 200 as a systemon-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the multi-subscription multi-standby communication device 200 may include, but are not limited to, a keypad 224 and a touchscreen display 226.

In some embodiments, the keypad 224, the touchscreen display 226, the microphone 212, or a combination thereof may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software modules and functions in the multi-subscription multi-standby communication device 200 to enable communication between them.

Functioning together, the two SIMs 204a, 204b, the baseband processor(s) 216, RF resources 218, 219, and the antennas 220, 221 may enable communications on two or more RATs. For example, one SIM, baseband processor, and RF resource may be configured to support two different RATs. In some embodiments, more RATs may be supported on the multi-subscription multi-standby communication device 200 by adding more SIM cards, SIM interfaces, RF resources, and antennas for connecting to additional mobile networks.

The multi-subscription multi-standby communication device 200 may optionally include a tune-away management unit 232 configured to manage the respective access of subscriptions associated with the first and second SIMs 204a, 204b to the RF resource 218 (and optionally the RF resource 219) in anticipation of or during a tune-away. In some embodiments, the tune-away management unit 232 may determine whether to initiate a tune-away from a first subscription to a second subscription or to a third subscription or whether to prevent or block a tune-away in order to improve data reception on the first subscription during the duration of the tune-away. In some embodiments, the tune-away management unit 232 may be implemented within the general-purpose processor 206. In other embodiments, the tune-away management unit 232 may be implemented as a separate hardware component (i.e., separate from the general-purpose processor 206). In some embodiments, the tune-away management unit 232 may be implemented as a software application stored within the memory 214 and executed by the general-purpose processor 206.

Figure 3:
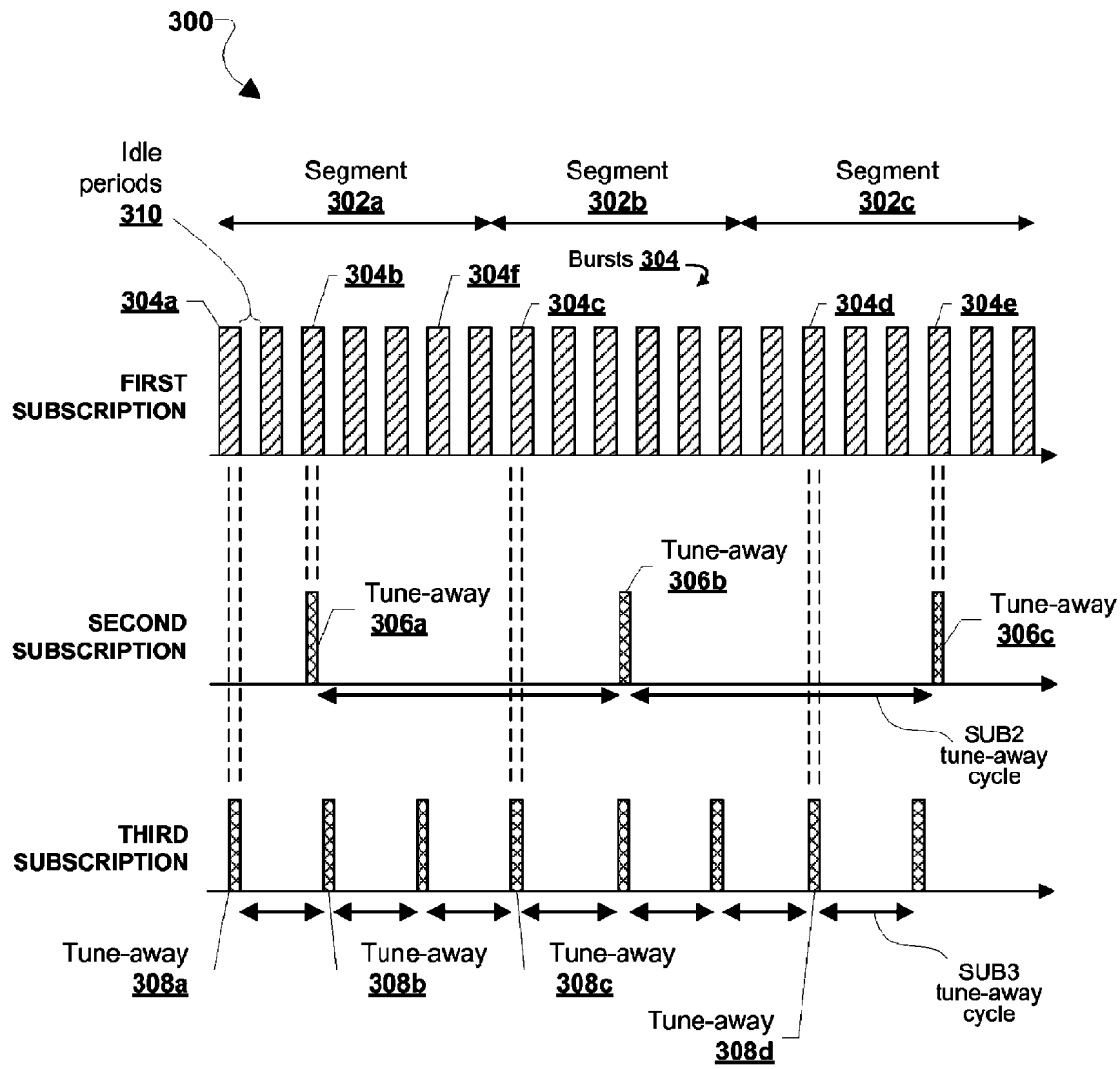
FIG. 3 is a timeline illustrating a reception of segments of a data stream by an RF resource of a multi-subscription multi-standby communication device according to various embodiments.

FIG. 3 illustrates a timeline 300 of a reception of segments of a data stream by an RF resource of a multi-subscription multi-standby communication device (e.g., the multi-subscription multi-standby communication device of FIGS. 1 and 2) according to some embodiments. With reference to FIGS. 1-3, a media file may be divided into portions for transport to the multi-subscription multi-standby communication device. For example, in the Dynamic Adaptive Streaming over HTTP (DASH) protocol, the media file may be divided into segments 302a, 302b, and 302c. Each segment may be sent to the communication device in one or more bursts 304 (e.g., 304a-304e), which may be interspersed with one or more idle periods 310. Data in a segment (segment data) may include media data (e.g., content data) and error correction data (such as forward error correction (FEC) data) that may enable the receiver device to recover a segment when some media data is lost or corrupted during transmission.

The multi-subscription multi-standby communication device (e.g., the multi-subscription multi-standby communication devices 110 and 200) may receive the data stream using the first subscription. A processor (e.g., the general-purpose processor 206 and/or the baseband modem processor 216) of the multi-subscription multi-standby communication device (i.e., a device processor) may also cause the device to perform one or more tune-aways from the first subscription to a second subscription and/or to a third subscription. Typically, tune-aways are periodically scheduled according to a timing dictated by a RAT. During the tune-away, an amount of data transmitted on the first subscription may be lost or corrupted and thus may be difficult or impossible to decode. For example, a tune-away 306a to the second subscription may collide (e.g., overlap in time with) the reception of a burst 304b on the first subscription during a segment 302a. As another example, a tune-away 308a to the third subscription may collide with the reception of a burst 304a on the first subscription. A tune-away that collides with the reception of segment data may thus decrease the throughput of communications between the multi-subscription multi-standby communication device and the communication network of the first subscription, and may degrade the quality of the communication session over the first communication network. The problem of data loss during a tune-away may also impact the user experience when the first subscription is conducting communications that are particularly sensitive to latency or data loss, such as streaming media. Thus, in various embodiments, the device processor may determine whether to permit or prevent a given tune-away.

A radio access technology may provide a periodic tune away cycle or timing, which may vary from RAT to RAT. For example, the second subscription may have a less frequent tune-away cycle than the third subscription. In such case, while the third subscription (with more frequently-scheduled tune-aways) may have more collisions with data reception on the first subscription than the second subscription, blocking tune aways to the third subscription may block fewer opportunities to receive data on the third subscription than opportunities to receive data on the second subscription. For example, during the reception of segments 302a, 302b, and 302c, tune-aways 306a and 306c to the second subscription may collide with bursts 304b and 304e on the first subscription, respectively. During the same time period, tune-aways 308a, 308c, and 308d to the third subscription may collide with bursts 304a, 304c, and 304d on the first subscription, respectively. Some tune-aways (e.g., tune-away 306b to the second subscription, and tune-away 308b to the third subscription) and some data bursts on the first subscription (e.g., burst 304f) may not experience a collision.

Because the third subscription has a shorter tune-away cycle (i.e., schedules tune-away more frequently) when the second subscription, blocking tune-aways to the third subscription may result in fewer missed opportunities to receive data over the third subscription than blocking tune-aways to the second subscription. Thus, in some embodiments, the MSMS communication device may prioritize the second subscription over the third subscription.

Additionally or alternatively, the MSMS communication device may determine that there are fewer collisions between tune-aways to the second subscription and first subscription data reception than collisions between tune-aways to the third subscription and first subscription data reception. Thus, in some embodiments, the MSMS communication device may prioritize the second subscription over the third subscription based on a number of collisions between data stream/segment reception and tune-aways to each subscription.

Figure 4:
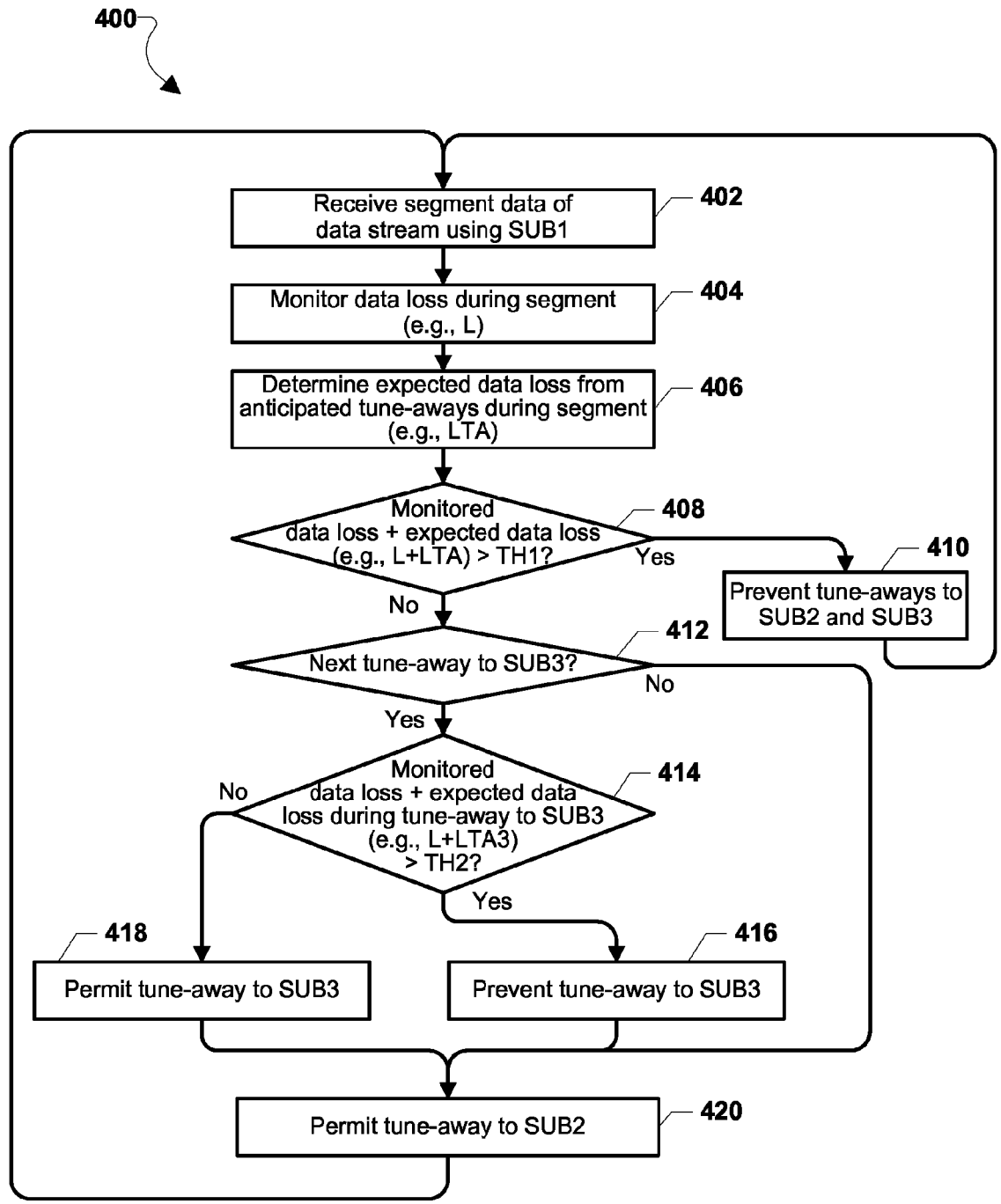
FIG. 4 is a process flow diagram illustrating a method for managing a tune-away by an RF resource of a multi-subscription multi-standby communication device according to various embodiments.

FIG. 4 illustrates a method 400 for managing a tune-away by an RF resource of a multi-subscription multi-standby (MSMS) communication device according to some embodiments. With reference to FIGS. 1-4, the method 400 may be implemented by a multi-subscription multi-standby communication device (e.g., the multi-subscription multi-standby communication device 102, 200), such as under the control of a processor (e.g., the general-purpose processor 206, the baseband processor 216, a separate controller, and/or the like) of the multi-subscription multi-standby communication device (i.e., a device processor).

In block 402, the device processor may receive segment data of a data stream using a first subscription (e.g., "SUB1"). In block 404, the device processor may monitor a data loss during a segment of the data stream. For example, a running data loss during the segment may be determined as a total amount of data loss at the end of each burst of the currently-received segment of the data stream (e.g., "L"). The device processor may update and monitor the running data loss during the receipt of each segment of the data stream. In some embodiments, the MSMS communication device may determine the amount of data loss based on an amount of segment data expected to be received and an amount of the segment data actually received by the MSMS communication device. The device processor may determine the amount of expected segment data based on information received by the MSMS communication device in the data stream (for example, multicast traffic channel (MCH) scheduling information (MSI)).

In block 406, the device processor may determine an amount of expected or anticipated data loss that will be caused by (e.g., attributable to) future tune-aways to all subscriptions (e.g., "LTA") during the segment. The device processor may determine the expected amount of data loss before the future tune away(s) occurs. In some embodiments, the device processor may determine an amount of expected data loss that will be caused by upcoming tune-aways to the second subscription and to the third subscription during the currently-received segment of the data stream. In some embodiments, the device processor may determine the portions of data loss attributable to each subscription has a measured amount of data lost (e.g., a number of bytes or kilobytes) during collisions between expected data reception and future tune away(s).

In various embodiments, the device processor may determine the amount of expected data loss from anticipated tune-aways at one or more times during the currently-received segment. In some embodiments, the device processor may determine the amount of expected data loss before, after, and/or during each burst of the segment. In some embodiments, the device processor may determine the amount of expected data loss before, after, and/or during each idle period during the segment. In some embodiments, the device processor may determine the amount of expected data loss with greater or lesser granularity (i.e., more frequently, or less frequently).

In block 408, the device processor may determine whether the monitored data loss (e.g., L) plus the amount of expected data loss caused by anticipated tune-aways (e.g., LTA) meets (e.g., is greater than) a first data loss threshold (e.g., "TH1"). In response to determining that the monitored data loss plus the expected data loss meets the first threshold (i.e., determination block 408="Yes"), the device processor may prevent tune-aways to the second subscription and to the third subscription in block 410. In some embodiments, the device processor may prevent tune-aways to the second subscription and the third subscription for the remainder of the segment of the data stream. The device processor may continue to receive segment data of the data stream using the first subscription in block 402.

In response to determining that the monitored data loss plus the expected data loss does not meet the first threshold (i.e., determination block 408="No"), the device processor may determine whether the next tune-away is a tune-away from the first subscription to the third subscription (e.g., "SUB3") in determination block 412.

In response to determining that the next tune-away is not to the third subscription (i.e., determination block 412="No"), the device processor may permit tune-aways to the second subscription (e.g., "SUB2") in block 420. The device processor may continue to receive segment data of the data stream using the first subscription in block 402.

In response to determining that the next tune-away is to the third subscription (i.e., determination block 412="Yes"), the device processor may determine whether the monitored data loss (e.g., L) plus an amount of data loss anticipated during the upcoming tune-away to the third subscription (e.g., "LTA3") meets (e.g., is greater than) a second data loss threshold (e.g., "TH2") in determination block 414.

In response to determining that the monitored data loss plus the amount of data loss anticipated during the upcoming tune-away to the third subscription meets the second data loss threshold (i.e., determination block 414="Yes"), the device processor may prevent (i.e., block) the upcoming tune-away to the third subscription in block 416.

In response to determining that the monitored data loss plus the amount of data anticipated during the upcoming tune-away to the third subscription does not meet the second data loss threshold (i.e., determination block 414="No"), the device processor may permit the upcoming tune-away to the third subscription in block 418.

In block 420, the device processor may permit one or more upcoming tune-aways to the second subscription. The device processor may continue to receive segment data of the data stream using the first subscription in block 402.

Figure 5:
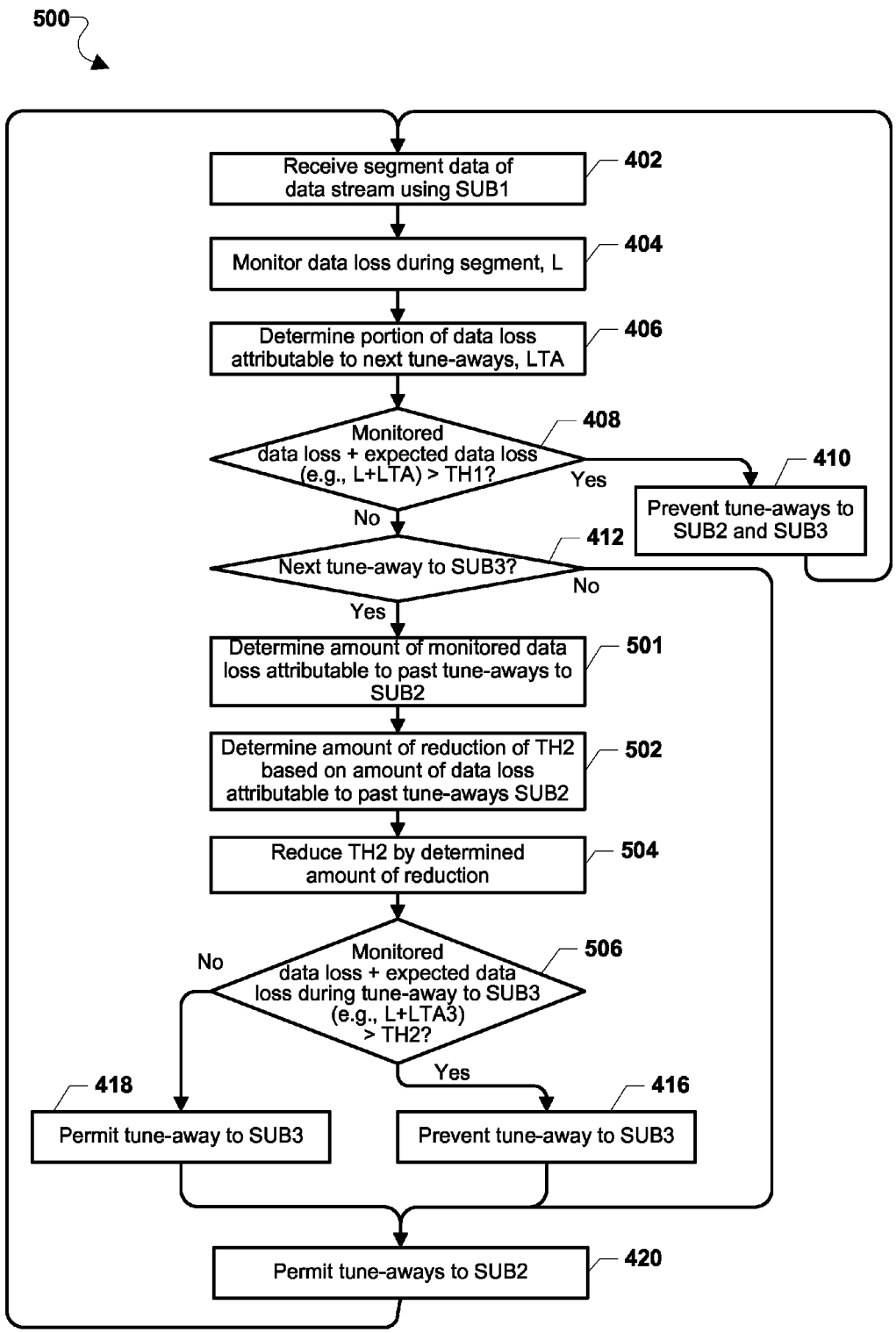
FIG. 5 is a process flow diagram illustrating another method for managing a tune-away by an RF resource of a multi-subscription multi-standby communication device according to various embodiments.

FIG. 5 illustrates a method 500 for managing a tune-away by an RF resource of an MSMS communication device according to some embodiments. With reference to FIGS. 1-5, the method 500 may be implemented by a multi-subscription multi-standby communication device (e.g., the multi-subscription multi-standby communication device 102, 200), such as under the control of a processor (e.g., the general-purpose processor 206, the baseband processor 216, a separate controller, and/or the like) of the multi-subscription multi-standby communication device (i.e., a device processor). In blocks 402-420, the device processor may perform operations of like-numbered blocks of the method 400 as described.

In response to determining that the next tune-away is to the third subscription (i.e., determination block 412="Yes"), the device processor may determine an amount of the monitored data loss (e.g., L) that is attributable to (e.g., caused by) past tune-aways (e.g., previous tune-aways during the present segment) to the second subscription in block 501.

In block 502, the device processor may determine an amount of reduction of the second data loss threshold (e.g., TH2) based on the amount of the monitored data loss that is attributable to past tune-aways to the second subscription. In some embodiments, the amount of reduction of the second data loss threshold may directly reflect the determined portion of data loss that is attributable to the second subscription. For example, if tune-aways to the second subscription are responsible for a data loss of 20 kB, the device processor may determine the amount of reduction of the second data loss threshold to be 20 kB. In some embodiments, the amount of reduction of the second data loss threshold may be proportional to the determined portion of data loss that is attributable to the second subscription. In some embodiments, the device processor may use the portion of data loss that is attributable to the second subscription as a factor in determining the amount of reduction of the second data loss threshold.

In block 504, the device processor may reduce the second data loss threshold by the determined amount of reduction. In determination block 506, the device processor may determine whether the monitored data loss plus the amount of data loss anticipated during the upcoming tune-away to the third subscription meets (e.g., is greater than) the reduced second data loss threshold. In response to determining that the monitored data loss plus the amount of data loss anticipated during the upcoming tune-away to the third subscription meets the reduced second data loss threshold (i.e., determination block 506="Yes"), the device processor may prevent (i.e., block) the upcoming tune-away to the third subscription in block 416.

In response to determining that the monitored data loss plus the amount of data loss anticipated during the upcoming tune-away to the third subscription does not meet the reduced second data loss threshold (i.e., determination block 506="No"), the device processor may permit the upcoming tune-away to the third subscription in block 418.

Figure 6:
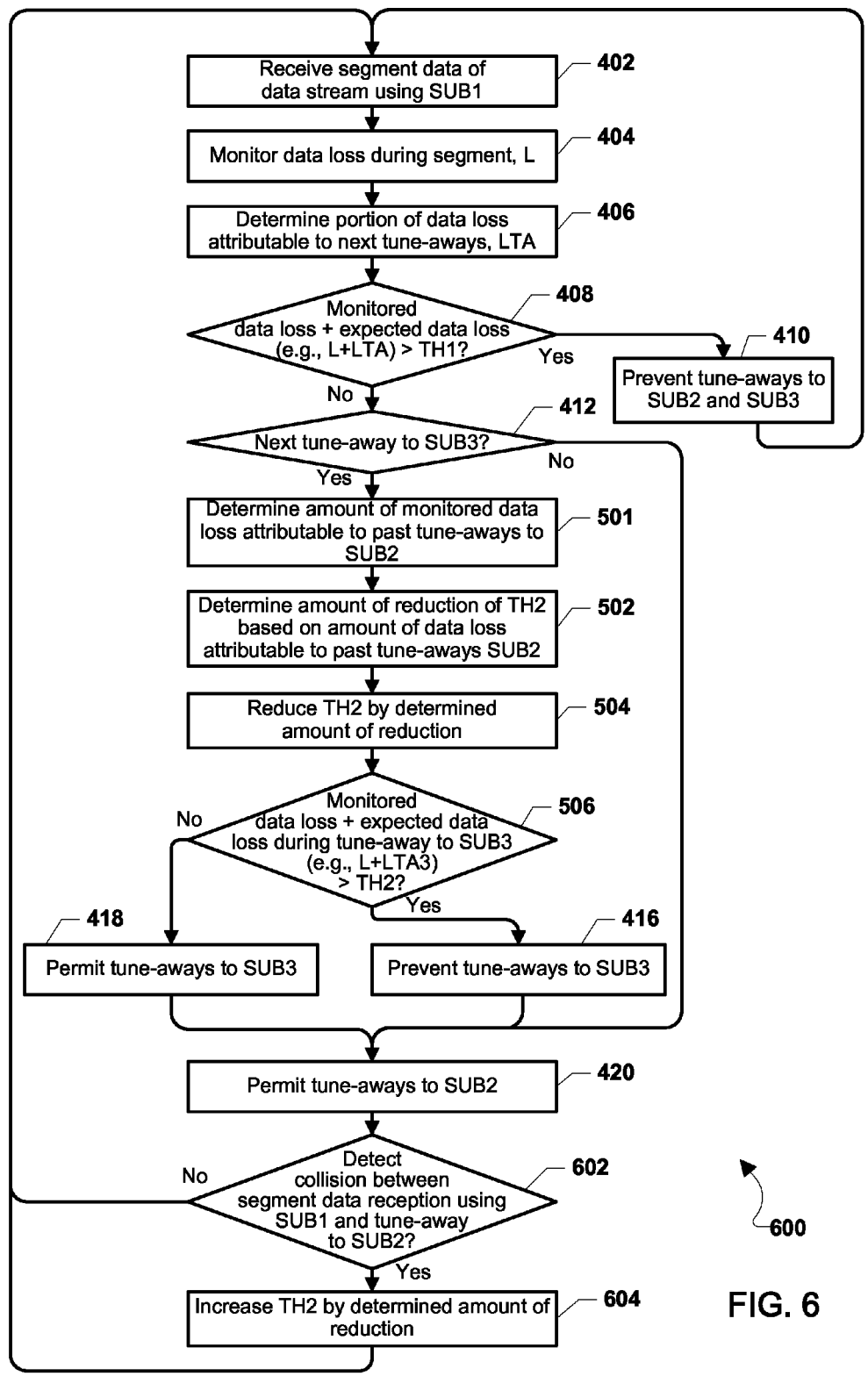
FIG. 6 is a process flow diagram illustrating another method for managing a tune-away by an RF resource of a multi-subscription multi-standby communication device according to various embodiments.

FIG. 6 illustrates a method 600 for managing a tune-away by an RF resource of an MSMS communication device according to some embodiments. With reference to FIGS. 1-6, the method 600 may be implemented by a multi-subscription multi-standby communication device (e.g., the multi-subscription multi-standby communication device 102, 200), such as under the control of a processor (e.g., the general-purpose processor 206, the baseband processor 216, a separate controller, and/or the like) of the multi-subscription multi-standby communication device (i.e., a device processor). In blocks 402-420 and blocks 502-506, the device processor may perform operations of like-numbered blocks of the methods 400 and 500 as described.

In block 602, the device processor may determine whether a collision is detected between segment data reception using the first subscription and a tune-away to the second subscription. In response to determining that no collision is detected between segment data reception using the first subscription and the tune-away to the second subscription (i.e., determination block 602="No"), the device processor may continue to receive segment data of the data stream using the first subscription in block 402.

In response to determining that a collision is detected between segment data reception using the first subscription and the tune-away to the second subscription (i.e., determination block 602="Yes"), the device processor may increase the second data loss threshold. For instance, the device processor may increase the second data loss threshold by the determined amount of reduction (e.g., the device processor may restore the second data loss threshold to its pre-reduction value) in block 604. Thus, in some embodiments, the device processor may stop preferentially blocking/preventing tune-aways to the third subscription in response to determining that the tune-away to the second subscription collides with reception of the data stream (e.g., reception of the present segment of the data stream) on the first subscription.

Figure 7:
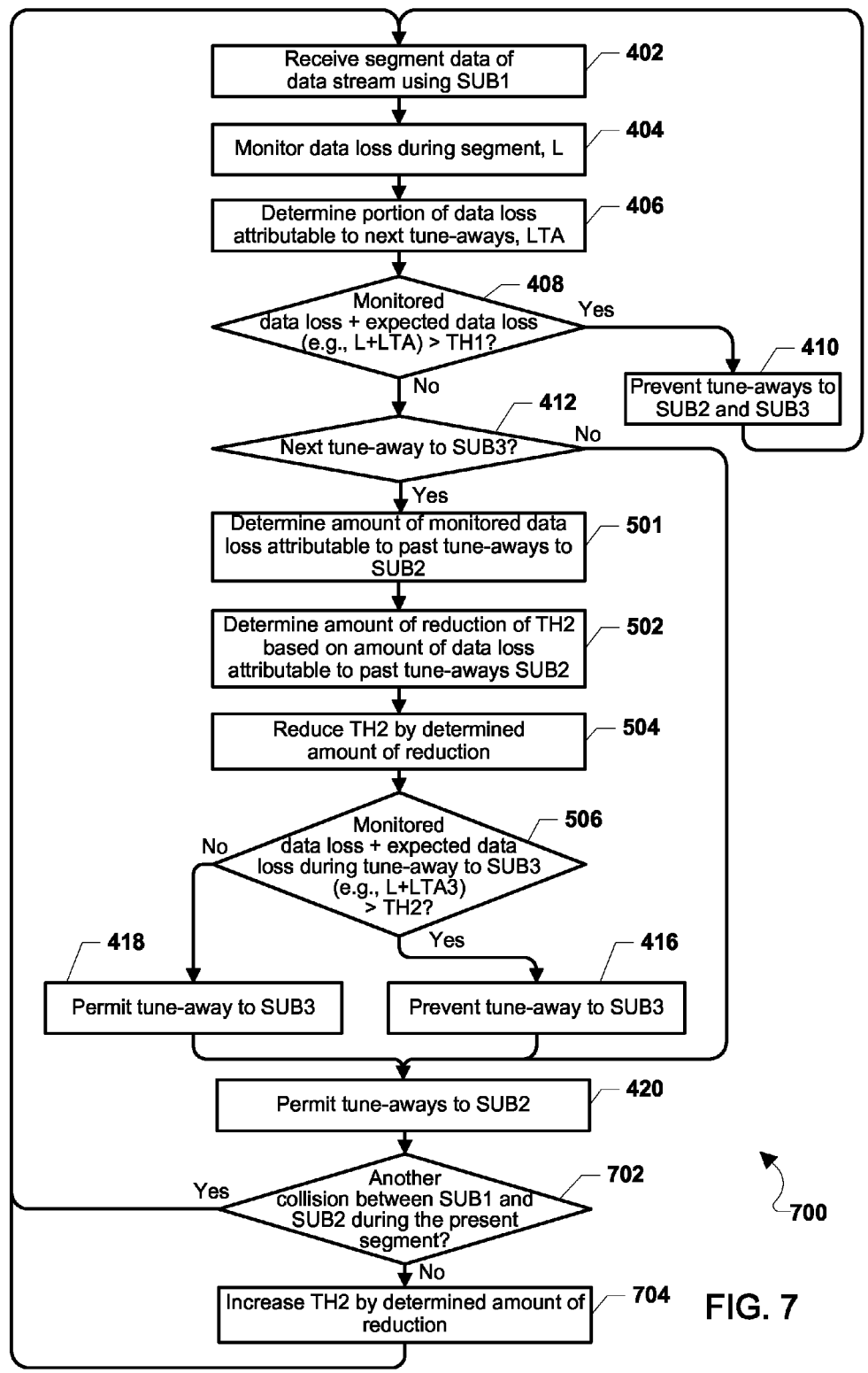
FIG. 7 is a process flow diagram illustrating another method for managing a tune-away by an RF resource of a multi-subscription multi-standby communication device according to various embodiments.

FIG. 7 illustrates a method 700 for managing a tune-away by an RF resource of an MSMS communication device according to some embodiments. With reference to FIGS. 1-7, the method 700 may be implemented by a multi-subscription multi-standby communication device (e.g., the multi-subscription multi-standby communication device 102, 200), such as under the control of a processor (e.g., the general-purpose processor 206, the baseband processor 216, a separate controller, and/or the like) of the multi-subscription multi-standby communication device (i.e., a device processor). In blocks 402-420 and blocks 502-506, the device processor may perform operations of like-numbered blocks of the methods 400 and 500 as described.

In some embodiments, the device processor may stop preferentially blocking tune-aways to the third subscription if doing so may not improve overall reception of the data stream using the first subscription. For example, in determination block 702, the device processor may determine whether another collision will occur between the first subscription (e.g., reception of the data stream using the first subscription) and a tune-away to the second subscription during the reception of the present segment of the data stream. In response to determining that there will be another collision between the first subscription and the second subscription (i.e., determination block 702="Yes"), the device processor may continue to receive segment data of the data stream using the first subscription in block 402. The device processor may also continue to use the reduced second data loss threshold to determine whether the portion of data loss attributable to tune-aways to third subscription satisfies the reduced second data loss threshold.

In response to determining that there will not be another collision between the first subscription and the second subscription (i.e., determination block 702="No"), then the device processor may increase the second data loss threshold by the determined amount of reduction (e.g., the device processor may restore the second data loss threshold to its pre-reduction value) in block 704.

Figure 8:
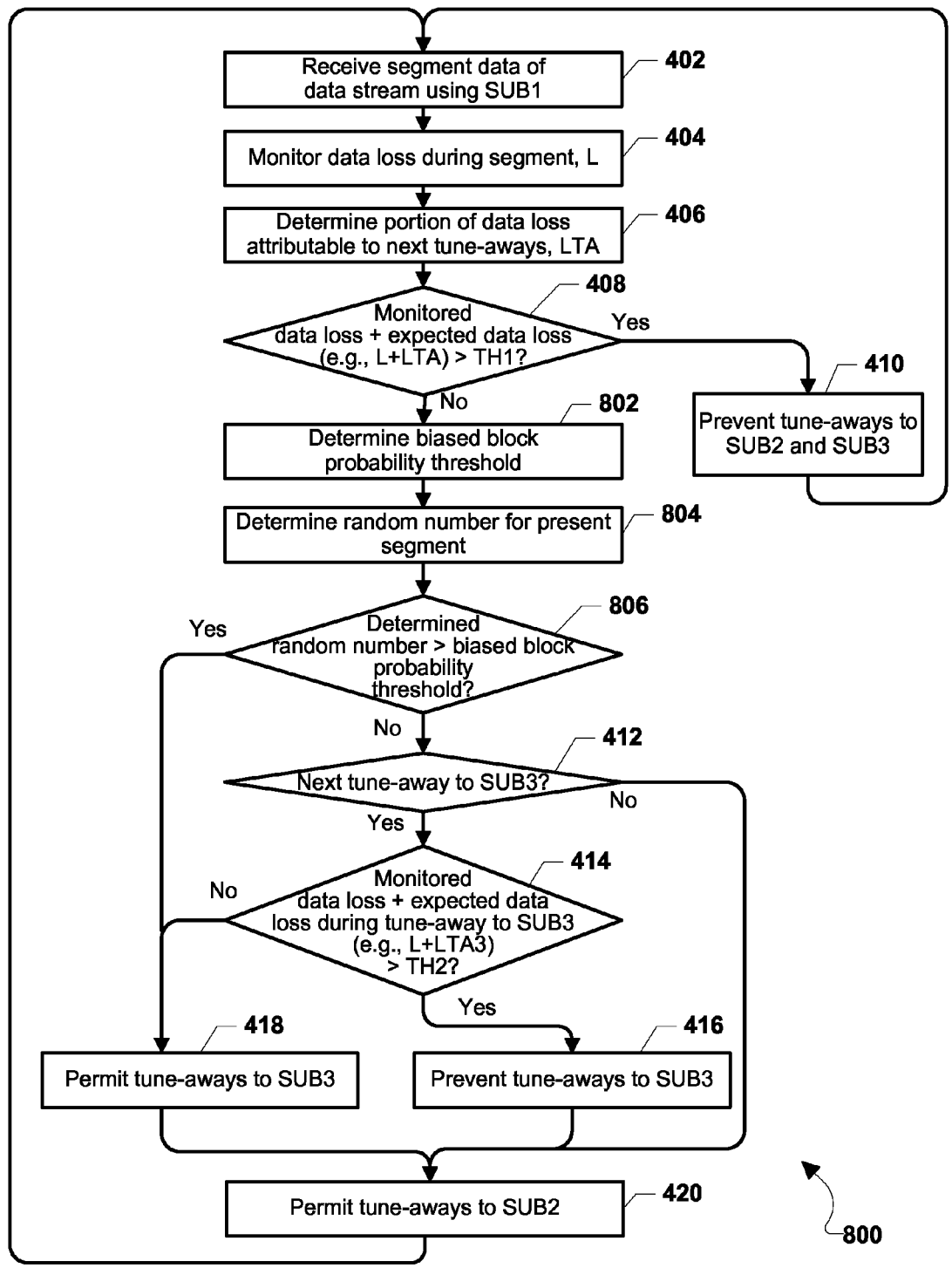
FIG. 8 is a process flow diagram illustrating another method for managing a tune-away by an RF resource of a multi-subscription multi-standby communication device according to various embodiments.

FIG. 8 illustrates a method 800 for managing a tune-away by an RF resource of an MSMS communication device according to some embodiments. With reference to FIGS. 1-8, the method 800 may be implemented by a multi-subscription multi-standby communication device (e.g., the multi-subscription multi-standby communication device 102, 200), such as under the control of a processor (e.g., the general-purpose processor 206, the baseband processor 216, a separate controller, and/or the like) of the multi-subscription multi-standby communication device (i.e., a device processor). In blocks 402-420 the device processor may perform operations of like-numbered blocks of the method 400 as described.

In some embodiments, the MSMS communication device may probabilistically apply tune-away blocking in order to only block tune-aways to the third subscription during some segments and not during others. For example, in block 802, the device processor may determine a biased block probability threshold. In some embodiments, the biased block probability threshold may be represented by R, and the device processor may determine a value for R such that $0 \leq R \leq 1$. In block 804, the device processor may determine a random (or pseudorandom) number for the present segment (e.g., the segment of the data stream that the MSMS communication device is currently receiving).

In determination block 806, the device processor may determine whether the determined random number meets (e.g., is greater than) the biased block probability threshold. In response to determining that the determined random number meets (e.g., is greater than) the biased block probability threshold (i.e., determination block 806="Yes"), the device processor may permit tune-aways to the third subscription in block 418. The device processor may then permit tune-aways to the second subscription in block 420.

In response to determining that the determined random number does not meet (e.g., is not greater than) the biased block probability threshold (i.e., determination block 806="No"), the device processor may determine whether the next tune-away is a tune-away from the first subscription to the third subscription (e.g., "SUB3") in determination block 412.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400, 500, 600, 700, and 800 may be substituted for or combined with one or more operations of the methods 400, 500, 600, 700, and 800.

Figure 9:
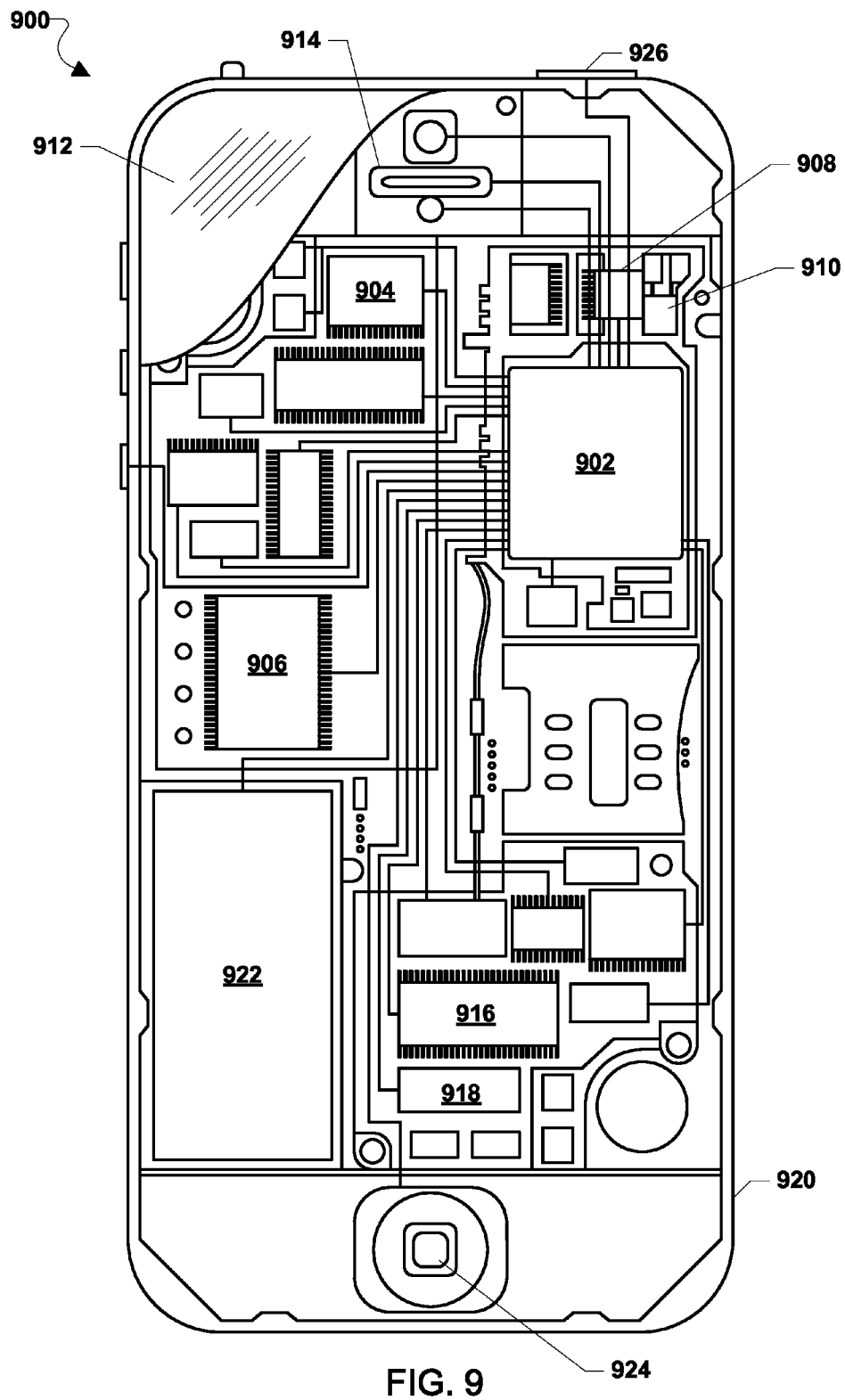
FIG. 9 is a component block diagram of a multi-subscription multi-standby communication device suitable for use with various embodiments.

Various embodiments (including, but not limited to, embodiments described with reference to FIGS. 1-8) may be implemented in any of a variety of multi-subscription multi-standby communication devices, an example of which (e.g., multi-subscription multi-standby communication device 900) is illustrated in FIG. 9. With reference to FIGS. 1-9, in various embodiments, the multi-subscription multi-standby communication device 900 (which may correspond, for example, to the multi-subscription multi-standby communication devices 102 and 200) may include a processor 902 coupled to a touchscreen controller 904 and an internal memory 906. The processor 902 may be one or more multi-core integrated circuits designated for general or specific processing tasks. The internal memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the multi-subscription multi-standby communication device 900 need not have touch screen capability.

The multi-subscription multi-standby communication device 900 may have two or more radio signal transceivers 908 (e.g., Peanut, Bluetooth, ZigBee, Wi-Fi, RF radio) and antennae 910, for sending and receiving communications, coupled to each other and/or to the processor 902. The transceivers 908 and antennae 910 may be used with the above-mentioned circuitry to implement the various wireless transmission protocol stacks and interfaces. The multi-subscription multi-standby communication device 900 may include one or more cellular network wireless modem chip(s) 916 coupled to the processor and antennae 910 that enables communication via two or more cellular networks via two or more radio access technologies.

The multi-subscription multi-standby communication device 900 may include a peripheral device connection interface 918 coupled to the processor 902. The peripheral device connection interface 918 may be singularly configured to accept one type of connection, or may be configured to accept various types of physical and communication connections, common or proprietary, such as USB, FireWire, Thunderbolt, or PCIe. The peripheral device connection interface 918 may also be coupled to a similarly configured peripheral device connection port (not shown).

The multi-subscription multi-standby communication device 900 may also include speakers 914 for providing audio outputs. The multi-subscription multi-standby communication device 900 may also include a housing 920, constructed of a plastic, metal, or a combination of materials, for containing all or some of the components discussed herein. The multi-subscription multi-standby communication device 900 may include a power source 922 coupled to the processor 902, such as a disposable or rechargeable battery. The rechargeable battery may also be coupled to the peripheral device connection port to receive a charging current from a source external to the multi-subscription multi-standby communication device 900. The multi-subscription multi-standby communication device 900 may also include a physical button 924 for receiving user inputs. The multi-subscription multi-standby communication device 900 may also include a power button 926 for turning the multi-subscription multi-standby communication device 900 on and off.

The processor 902 may be any programmable microprocessor, microcomputer or multiple processor chip or chips that can be configured by software instructions (applications) to perform a variety of functions, including the functions of various embodiments described below. In some multi-subscription multi-standby communication devices, multiple processors 902 may be provided, such as one processor dedicated to wireless communication functions and one processor dedicated to running other applications. Typically, software applications may be stored in the internal memory 906 before they are accessed and loaded into the processor 902. The processor 902 may include internal memory sufficient to store the application software instructions.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method implemented on a multi-subscription multi-standby (MSMS) communication device for managing a tune-away by a radio frequency (RF) resource, comprising:
monitoring an amount of data loss from a broadcast data stream received by the MSMS communication device using a first subscription;
determining an amount of expected data loss from anticipated tune-aways from the first subscription to a second subscription;
determining an amount of expected data loss from anticipated tune-aways from the first subscription to a third subscription;
determining whether the amount of the monitored data loss plus the amount of expected data loss from anticipated tune-aways from the first subscription to the second subscription plus the amount of expected data loss from anticipated tune-aways from the first subscription to the third subscription meets a first data loss threshold;
determining whether an amount of the monitored data loss plus an amount of expected data loss from a next anticipated tune-away from the first subscription to the third subscription meets a second data loss threshold, in response to determining that the amount of the monitored data loss plus the amount of expected data loss from anticipated tune-aways from the first subscription to the second subscription plus the amount of expected data loss from anticipated tune-aways from the first subscription to the third subscription does not meet the first data loss threshold; and
preventing a tune-away of the RF resource from the first subscription to the third subscription, in response to determining that the amount of the monitored data loss plus the amount of expected data loss from the next anticipated tune-away from the first subscription to the third subscription meets the second data loss threshold.

2. The method of claim 1, further comprising:
permitting the tune-away of the RF resource from the first subscription to the third subscription, in response to determining that the amount of the monitored data loss plus the amount of expected data loss from the next anticipated tune-away from the first subscription to the third subscription does not meet the second data loss threshold.

3. The method of claim 1, further comprising:
permitting a tune-away of the RF resource from the first subscription to the second subscription after determining whether the amount of the monitored data loss plus the amount of expected data loss from the next anticipated tune-away from the first subscription to the third subscription meets the second data loss threshold.

4. The method of claim 1, further comprising:
preventing tune-aways from the first subscription to the second subscription and to the third subscription, in response to determining that the amount of the monitored data loss plus the amount of expected data loss from anticipated tune-aways from the first subscription to the second subscription plus the amount of expected data loss from anticipated tune-aways from the first subscription to the third subscription meets the first data loss threshold.

5. The method of claim 1, wherein preventing a tune-away of the RF resource from the first subscription to the third subscription, in response to determining that the amount of the monitored data loss plus the amount of expected data loss from the next anticipated tune-away from the first subscription to the third subscription meets the second data loss threshold comprises:
  determining an amount of reduction for the second data loss threshold based on an amount of data loss that is attributable to past tune-aways from the first subscription to the second subscription;
  reducing the second data loss threshold by the determined amount of reduction;
  determining whether the amount of the monitored data loss plus the amount of expected data loss from the next anticipated tune-away from the first subscription to the third subscription meets the reduced second data loss threshold; and
  preventing the tune-away of the RF resource from the first subscription to the third subscription, in response to determining that the amount of the monitored data loss plus the amount of expected data loss from the next anticipated tune-away from the first subscription to the third subscription meets the reduced second data loss threshold.

6. The method of claim 5, further comprising:
  permitting the tune-away of the RF resource from the first subscription to the third subscription, in response to determining that the amount of the monitored data loss plus the amount of expected data loss from the next anticipated tune-away from the first subscription to the third subscription does not meet the reduced second data loss threshold.

7. The method of claim 5, further comprising:
  determining whether a collision between reception of the broadcast data stream and a tune-away from the first subscription to the second subscription is detected; and
  increasing the second data loss threshold, in response to determining that the collision between reception of the broadcast data stream and the tune-away from the first subscription to the second subscription is detected.

8. The method of claim 7, wherein increasing the second data loss threshold comprises increasing the second data loss threshold by the determined amount of reduction, in response to determining that the collision between reception of the broadcast data stream and the tune-away from the first subscription to the second subscription is detected.

9. The method of claim 7, further comprising:
  continuing to receive segment data of the broadcast data stream using the first subscription, in response to determining that the collision between reception of the broadcast data stream and the tune-away from the first subscription to the second subscription is not detected.

10. The method of claim 7, further comprising:
  determining whether another collision between reception of the broadcast data stream and a tune-away from the first subscription to the second subscription is expected; and
  increasing the second data loss threshold, in response to determining that the another collision between reception of the broadcast data stream and the tune-away from the first subscription to the second subscription is not expected.

11. The method of claim 10, wherein increasing the second data loss threshold comprises increasing the second data loss threshold by the determined amount of reduction, in response to determining that the another collision between reception of the broadcast data stream and the tune-away from the first subscription to the second subscription is not expected.

12. The method of claim 10, further comprising:
  continuing to receive segment data of the broadcast data stream using the first subscription, in response to determining that the another collision between reception of the broadcast data stream and the tune-away from the first subscription to the second subscription is expected.

13. The method of claim 1, further comprising:
  determining a biased block probability threshold;
  determining a random number for a present segment of the broadcast data stream;
  determining whether the determined random number meets the biased block probability threshold; and
  permitting tune-aways of the RF resource from the first subscription to the third subscription, in response to determining that the determined random number meets the biased block probability threshold.

14. The method of claim 13, further comprising:
  determining whether an amount of the monitored data loss plus an amount of expected data loss from a next anticipated tune-away from the first subscription to the third subscription meets the second data loss threshold, in response to determining that the determined random number does not meet the biased block probability threshold.

15. A multi-subscription multi-standby (MSMS) communication device, comprising:
  a memory;
  a radio frequency (RF) resource; and
  a processor coupled to the memory and the radio frequency resource and configured with processor-executable instructions to:
  monitor an amount of data loss from a broadcast data stream received by the MSMS communication device using a first subscription;
  determine an amount of expected data loss from anticipated tune-aways from the first subscription to a second subscription;
  determine an amount of expected data loss from anticipated tune-aways from the first subscription to a third subscription;
  determine whether the amount of the monitored data loss plus the amount of expected data loss from anticipated tune-aways from the first subscription to the second subscription plus the amount of expected data loss from anticipated tune-aways from the first subscription to the third subscription meets a first data loss threshold;
  determine whether an amount of the monitored data loss plus an amount of expected data loss from a next anticipated tune-away from the first subscription to the third subscription meets a second data loss threshold, in response to determining that the amount of the monitored data loss plus the amount of expected data loss from anticipated tune-aways from the first subscription to the second subscription plus the amount of expected data loss from anticipated tune-aways from the first subscription to the third subscription does not meet the first data loss threshold; and
  prevent a tune-away of the RF resource from the first subscription to the third subscription, in response to determining that the amount of the monitored data loss plus the amount of expected data loss from the next anticipated tune-away from the first subscription to the third subscription meets the second data loss threshold.

16. The multi-subscription multi-standby communication device of claim 15, wherein the processor is further configured with processor-executable instructions to permit the tune-away of the RF resource from the first subscription to the third subscription, in response to determining that the amount of the monitored data loss plus the amount of expected data loss from the next anticipated tune-away from the first subscription to the third subscription does not meet the second data loss threshold.

17. The multi-subscription multi-standby communication device of claim 15, wherein the processor is further configured with processor-executable instructions to permit a tune-away of the RF resource from the first subscription to the second subscription after determining whether the amount of the monitored data loss plus the amount of expected data loss from the next anticipated tune-away from the first subscription to the third subscription meets the second data loss threshold.

18. The multi-subscription multi-standby communication device of claim 15, wherein the processor is further configured with processor-executable instructions to prevent tune-aways from the first subscription to the second subscription and to the third subscription, in response to determining that the amount of the monitored data loss plus the amount of expected data loss from anticipated tune-aways from the first subscription to the second subscription plus the amount of expected data loss from anticipated tune-aways from the first subscription to the third subscription meets the first data loss threshold.

19. The multi-subscription multi-standby communication device of claim 15, wherein the processor is further configured with processor-executable instructions to prevent a tune-away of the RF resource from the first subscription to the third subscription, in response to determining that the amount of the monitored data loss plus the amount of expected data loss from the next anticipated tune-away from the first subscription to the third subscription meets the second data loss threshold by:
determining an amount of reduction for the second data loss threshold based on an amount of data loss that is attributable to past tune-aways from the first subscription to the second subscription;
reducing the second data loss threshold by the determined amount of reduction;
determining whether the amount of the monitored data loss plus the amount of expected data loss from the next anticipated tune-away from the first subscription to the third subscription meets the reduced second data loss threshold; and
preventing the tune-away of the RF resource from the first subscription to the third subscription, in response to determining that the amount of the monitored data loss plus the amount of expected data loss from the next anticipated tune-away from the first subscription to the third subscription meets the reduced second data loss threshold.

20. The multi-subscription multi-standby communication device of claim 19, wherein the processor is further configured with processor-executable instructions to:
permit the tune-away of the RF resource from the first subscription to the third subscription, in response to determining that the amount of the monitored data loss plus the amount of expected data loss from the next anticipated tune-away from the first subscription to the third subscription does not meet the reduced second data loss threshold.

21. The multi-subscription multi-standby communication device of claim 19, wherein the processor is further configured with processor-executable instructions to:
determine whether a collision between reception of the broadcast data stream and a tune-away from the first subscription to the second subscription is detected; and
increase the second data loss threshold, in response to determining that the collision between reception of the broadcast data stream and the tune-away from the first subscription to the second subscription is detected.

22. The multi-subscription multi-standby communication device of claim 21, wherein the processor is further configured with processor-executable instructions to:
increase the second data loss threshold by the determined amount of reduction, in response to determining that the collision between reception of the broadcast data stream and the tune-away from the first subscription to the second subscription is detected.

23. The multi-subscription multi-standby communication device of claim 21, wherein the processor is further configured with processor-executable instructions to:
continue to receive segment data of the broadcast data stream using the first subscription, in response to determining that the collision between reception of the broadcast data stream and the tune-away from the first subscription to the second subscription is not detected.

24. The multi-subscription multi-standby communication device of claim 21, wherein the processor is further configured with processor-executable instructions to:
determine whether another collision between reception of the broadcast data stream and a tune-away from the first subscription to the second subscription is expected; and
increase the second data loss threshold, in response to determining that the another collision between reception of the broadcast data stream and the tune-away from the first subscription to the second subscription is not expected.

25. The multi-subscription multi-standby communication device of claim 24, wherein the processor is further configured with processor-executable instructions to:
increase the second data loss threshold by the determined amount of reduction, in response to determining that the another collision between reception of the broadcast data stream and the tune-away from the first subscription to the second subscription is not expected.

26. The multi-subscription multi-standby communication device of claim 24, wherein the processor is further configured with processor-executable instructions to:
continue to receive segment data of the broadcast data stream using the first subscription, in response to determining that the another collision between reception of the broadcast data stream and the tune-away from the first subscription to the second subscription is expected.

27. The multi-subscription multi-standby communication device of claim 15, wherein the processor is further configured with processor-executable instructions to:
determine a biased block probability threshold;
determine a random number for a present segment of the broadcast data stream;
determine whether the determined random number meets the biased block probability threshold; and
permit the tune-aways of the RF resource from the first subscription to the third subscription, in response to determining that the determined random number meets the biased block probability threshold.

28. The multi-subscription multi-standby communication device of claim 27, wherein the processor is further configured with processor-executable instructions to:
determine whether an amount of the monitored data loss plus an amount of expected data loss from a next anticipated tune-away from the first subscription to the third subscription meets the second data loss threshold, in response to determining that the determined random number does not meet the biased block probability threshold.

29. A multi-subscription multi-standby (MSMS) communication device, comprising:
    means for monitoring an amount of data loss from a broadcast data stream received by the MSMS communication device using a first subscription;
    means for determining an amount of expected data loss from anticipated tune-aways from the first subscription to a second subscription;
    means for determining an amount of expected data loss from anticipated tune-aways from the first subscription to a third subscription;
    means for determining whether the amount of the monitored data loss plus the amount of expected data loss from anticipated tune-aways from the first subscription to the second subscription plus the amount of expected data loss from anticipated tune-aways from the first subscription to the third subscription meets a first data loss threshold;
    means for determining whether an amount of the monitored data loss plus an amount of expected data loss from a next anticipated tune-away from the first subscription to the third subscription meets a second data loss threshold, in response to determining that the amount of the monitored data loss and plus the amount of expected data loss from anticipated tune-aways from the first subscription to the second subscription plus the amount of expected data loss from anticipated tune-aways from the first subscription to the third subscription does not meet the first data loss threshold; and
    means for preventing a tune-away of the RF resource from the first subscription to the third subscription, in response to determining that the amount of the monitored data loss plus the amount of expected data loss from the next anticipated tune-away from the first subscription to the third subscription meets the second data loss threshold.

30. A non-transitory processor-readable storage medium having stored thereon processor-executable instructions configured to cause a processor of a multi-subscription multi-standby (MSMS) communication device to perform operations comprising:
    monitoring an amount of data loss from a broadcast data stream received by the MSMS communication device using a first subscription;
    determining an amount of expected data loss from anticipated tune-aways from the first subscription to a second subscription;
    determining an amount of expected data loss from anticipated tune-aways from the first subscription to a third subscription;
    determining whether the amount of the monitored data loss plus the amount of expected data loss from anticipated tune-aways from the first subscription to the second subscription plus the amount of expected data loss from anticipated tune-aways from the first subscription to the third subscription meets a first data loss threshold;
    determining whether an amount of the monitored data loss plus an amount of expected data loss from a next anticipated tune-away from the first subscription to the third subscription meets a second data loss threshold, in response to determining that the amount of the monitored data loss plus the amount of expected data loss from anticipated tune-aways from the first subscription to the second subscription plus the amount of expected data loss from anticipated tune-aways from the first subscription to the third subscription does not meet the first data loss threshold; and
    preventing a tune-away of the RF resource from the first subscription to the third subscription, in response to determining that the amount of the monitored data loss plus the amount of expected data loss from the next anticipated tune-away from the first subscription to the third subscription meets the second data loss threshold.

* * * * *